US008643486B2

(12) United States Patent
Hess

(10) Patent No.: US 8,643,486 B2
(45) Date of Patent: Feb. 4, 2014

(54) PORTABLE ALARM DEVICE

(75) Inventor: Brian K. Hess, Westerville, OH (US)

(73) Assignee: TattleTale Portable Alarm Systems, Inc., Westerville, OH (US)

( * ) Notice: Subject to any disclaimer, the term of this patent is extended or adjusted under 35 U.S.C. 154(b) by 639 days.

(21) Appl. No.: 12/743,731

(22) PCT Filed: Oct. 20, 2008

(86) PCT No.: PCT/US2008/080558
§ 371 (c)(1),
(2), (4) Date: Oct. 4, 2010

(87) PCT Pub. No.: WO2009/052526
PCT Pub. Date: Apr. 23, 2009

(65) Prior Publication Data

US 2011/0012729 A1 Jan. 20, 2011

Related U.S. Application Data

(60) Provisional application No. 60/981,251, filed on Oct. 19, 2007.

(51) Int. Cl.
*G08B 1/08* (2006.01)
*G08B 13/12* (2006.01)
*H04M 11/04* (2006.01)

(52) U.S. Cl.
USPC ............ 340/539.13; 340/539.11; 340/539.21; 340/508; 340/542; 340/548; 340/568.4; 455/404.2

(58) Field of Classification Search
USPC ............ 340/539.13, 539.11, 539.15, 539.21, 340/539.23, 508, 542, 548, 549, 568.2, 340/568.4
See application file for complete search history.

(56) References Cited

U.S. PATENT DOCUMENTS 5,200,735 A * 4/1993 Hines ........................ 340/539.11
5,754,108 A * 5/1998 Ungarsohn ................ 340/568.1
2002/0113704 A1* 8/2002 Hess .......................... 340/568.2
2002/0113705 A1 8/2002 Wallace
2004/0113778 A1 6/2004 Script et al.
2005/0057359 A1* 3/2005 Coffey et al. ............ 340/539.21
2006/0202840 A1* 9/2006 Korbonski ................. 340/573.4
2007/0224980 A1 9/2007 Wakefield

FOREIGN PATENT DOCUMENTS

EP 1533767 A1 5/2005

OTHER PUBLICATIONS

International Search Report for PCT/US2008/080558 dated Oct. 5, 2009.

* cited by examiner

*Primary Examiner* — Donnie Crosland
(74) *Attorney, Agent, or Firm* — Harness, Dickey & Pierce, PLC

(57) ABSTRACT

A portable alarm device includes a portable enclosure, a wireless communication system disposed in the portable enclosure and configured to receive a signal from a monitoring device. The device further includes a processor in communication with the wireless communication system and wherein the processor is configured to initiate an alert when the signal indicates that the portable enclosure is beyond a pre-determined distance from the monitoring device.

37 Claims, 4 Drawing Sheets

PORTABLE ALARM DEVICE

CROSS REFERENCE TO RELATED APPLICATIONS

This application is a National Phase of International Application No. PCT/US08/80558, filed on Oct. 20, 2008, which claims priority to U.S. Provisional Application No. 60/981,251 filed on Oct. 19, 2007, which applications are hereby incorporated by reference in their entirety.

BACKGROUND

Alarm systems are often used to protect people and/or their property from various threats. In its broadest sense, a threat can be anything that can cause harm to a person and/or their property, but generally include intruders, burglars, and disasters like fires and floods. In some cases, alarm systems sound an audible alert in response to an event, such as a broken window. Others may send an alert to a central monitoring station, which then notifies the police department or other security agency.

In most cases, alarm systems are integrated, which implies that the alarm system is hard-wired into the property it's intended to protect. Consequently, they are not readily removable after installation. In addition, hardwired alarm systems are generally expensive from both an equipment and installation standpoint and are generally dedicated to protecting only one item of property.

A portable alarm system, on the other hand, may be used to protect various types of property, is generally easy to install, easy to transport, and readily removable. Therefore, a portable alarm system can provide security to all types of property, and people in all sorts of places, without significant installation time and expense. Portable alarm systems, unlike their integrated counterparts, are not hard-wired or integrated into the property that they are protecting. So, while a portable alarm system may be used to protect a house, it may also be used to protect a hotel room, rental property, a car, a boat, etc.

DETAILED DESCRIPTION

A compact portable alarm device for protecting people and/or property from various threats is provided. The device can be placed in a secured or un-secured manner to a piece of property (e.g., car, bike, room, personal property) and protect that property from theft and vandalism, as well as other threats. Once the device is placed to protect an article of property, it can be armed such that it will respond to a detected security event, such as an attempted break-in or unanticipated movement of the property. The device protects property by initiating an alert in response to a security event. The alert can be an audible siren, or a signal to a remote device or central monitoring station. The portable alarm device can be used alone, or as part of a security system that includes a monitoring device and/or a central monitoring station. Furthermore, the device may provide periodic updates after detecting a security event, such as by periodically providing location information to a remote device.

Figure 1:
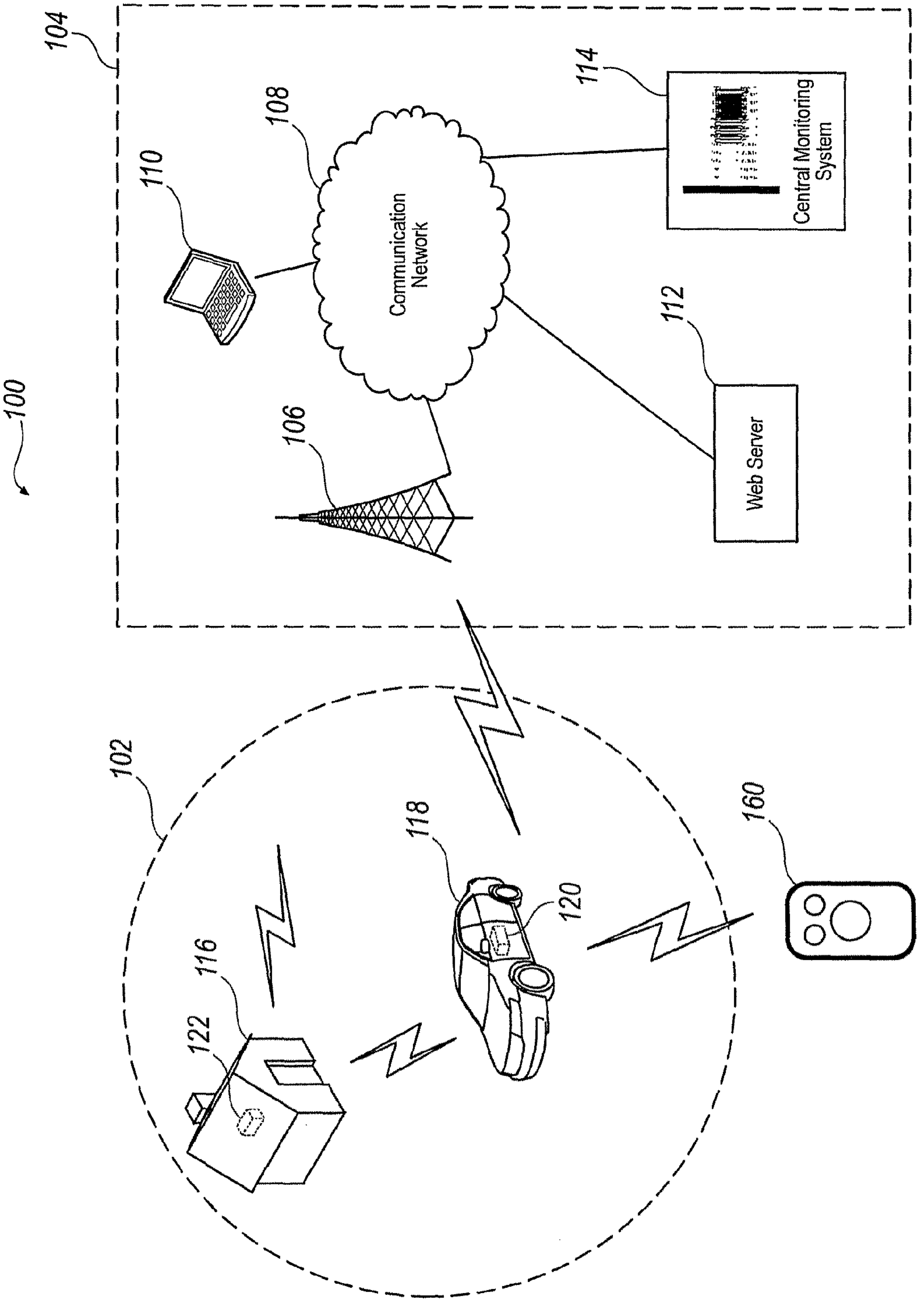

FIG. 1 illustrates an exemplary security system 100 for protecting people and/or their property. System 100 generally includes a customer premise 102 in communication with a plurality of remote network devices 104 that may include, but are not limited to, a cellular base station 106, a communication network 108, a personal computer (PC) 110, a web server 112, and a central monitoring station (CMS) 114. Generally, communication network 108 enables communication from alarm devices at the customer premise 102 to the remote network devices 104, such as PC 110, web server 112, and central monitoring station 114. In the embodiment shown in FIG. 1, the customer premise 102 includes a house 116 and a vehicle 118, but may also include any combination of property or articles of property such as, for example, a business, apartment, hotel room, storage unit, garage, parking lot, building site, boat, equipment, or any other location and/or personal property.

System 100 also includes a compact alarm monitoring device 120, which in the embodiment shown in FIG. 1, is located within vehicle 118. Alarm monitoring device 120 can be configured to operate as a stand alone alarm system or as an accessory to an alarm base station 122, which in the embodiment shown in FIG. 1, is located within house 116. Alarm base station 122 is generally a portable alarm device or system, such as those described in the following U.S. patents, which are hereby incorporated herein by reference: U.S. Pat. Nos. 5,587,701; 5,777,551; 5,850,180; 6,049,273; 6,441,731; and 6,831,557. Of course, system 100 may include multiple alarm base stations 122 and/or multiple compact alarm monitoring devices 120, protecting numerous items and various forms of personal property.

System 100 may also include equipment and devices to enable alarm base station 122 and alarm monitoring device 120 to communicate with other remote devices and services. Cellular base station 106 is generally a wireless communication cellular tower connected to a wireless or cellular network. Communication network 108 may include such a cellular network, and may also include various wide area networks (WANs) and local area networks (LANs). Generally, communication network 108 enables communication from alarm base station 122 and alarm monitoring device 120 to other devices, such as PC 110, web server 112, and central monitoring station 114.

PC 110 is generally any Internet connected personal computer. Generally, a user can use PC 110 to monitor customer premises 102, configure alarm base station 122 and alarm monitoring device 120, and receive information from any number of different devices within system 100. In one embodiment, a user using PC 110 can receive information from alarm base station 122 and alarm monitoring device 120. Such information may be received either directly from alarm base station 122 and alarm monitoring device 120, or from an intermediary like web server 112 or central monitoring station 114. In another embodiment, a user can both send and receive information to and from alarm base station 122 and alarm monitoring device 120, either directly or indirectly. For example, alarm base station 122 and alarm monitoring device 120 may be in communication with central monitoring station 114, which may in turn communicate with web server 112. A user using PC 110 may communicate with web server 112 to receive information from alarm base station 122 and alarm monitoring device 120, or a user can request configuration changes through web server 112. Such information and requests can then be communicated to alarm base station 122 and alarm monitoring device 120 through central monitoring station 114. Alternatively, such communications could occur directly between web server 112 and alarm base station 122 and alarm monitoring device 120, or directly between PC 110 and alarm base station 122 and alarm monitoring device 120.

Central monitoring station 114 provides constant monitoring of alarm base station 122 and alarm monitoring device 120 within customer premises 102, and provides additional security assistance in response to a security event. For example, central monitoring station 114 may receive periodic updates from alarm base station 122 or alarm monitoring device 120. In the event that such updates cease, central monitoring station 114 may provide various services, such as calling customer premises 102 or dispatching the police to customer premises 102. Alternatively, as discussed in greater detail below, alarm monitoring device 120 may be configured to determine if it is out of range of base station 122, and respond, for example, by enabling a position tracker. In this exemplary approach, base station 122 or central monitoring station 114 may still provide the various services previously described, or alternatively, the alarm monitoring device 120 may communicate directly with the communication network 108 to request and/or provide the various services.

Figure 2:
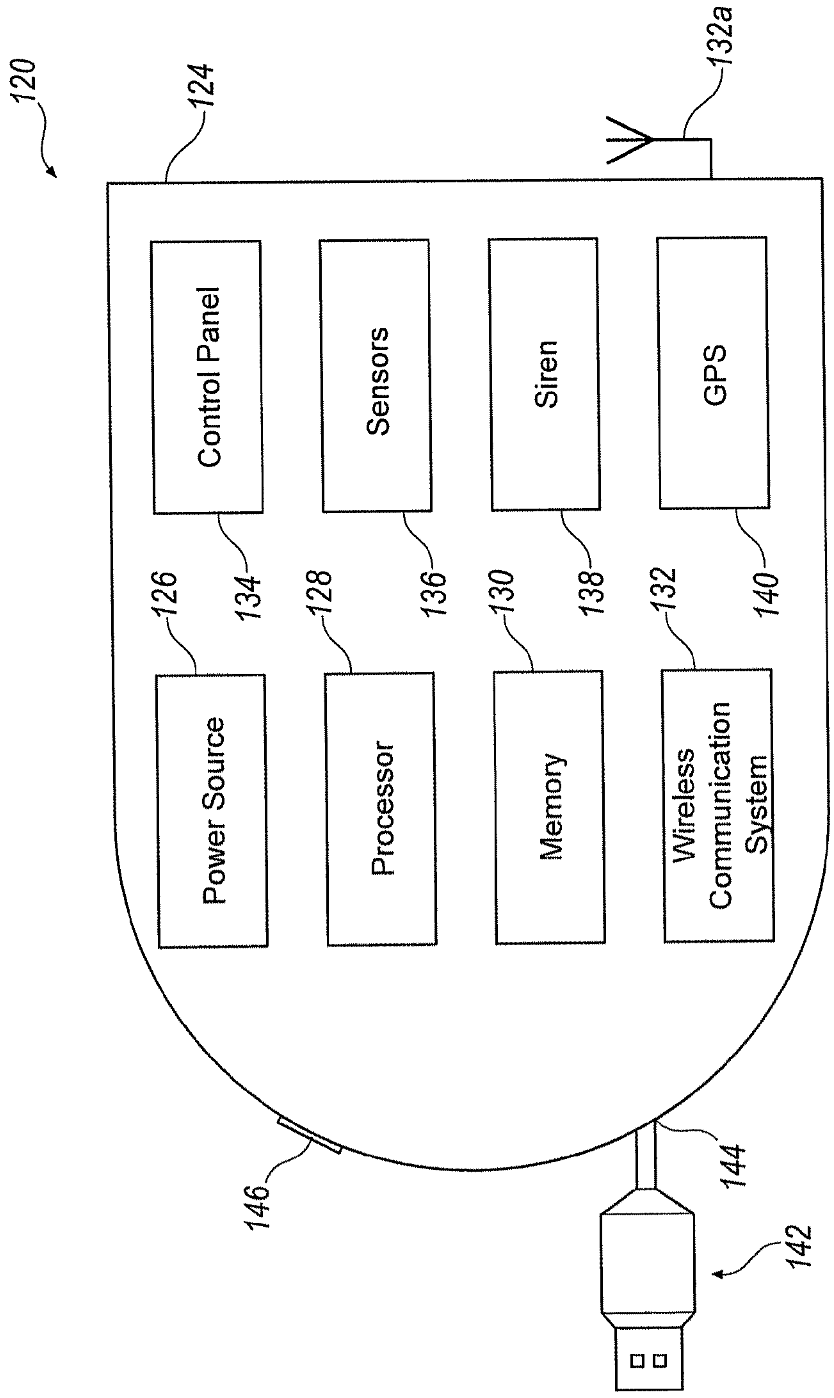

FIG. 2 illustrates an exemplary schematic diagram of a compact alarm monitoring device 120 that includes a portable enclosure 124 that houses a power source 126, a processor/computing device 128, a memory 130 and a wireless communications system 132. Compact alarm monitoring device 120 may further include a control panel 134, one or more sensors 136, a siren 138, a global positioning system (GPS) 140 and a retractable, detachable security loop 142.

In one embodiment, power source 126 is a rechargeable battery, but may also be a connection to an electrical outlet, such as an AC or DC power outlet. Power source 126 may also include a non-rechargeable battery, a solar panel, or some other AC or DC power source.

Processor 128 interprets computer program instructions and processes data. Together, processor 128 and memory 130 execute and store various computer readable programs that communicate, interact, and control the various components of alarm monitoring device 120. In one embodiment, processor 128 is a microcontroller, but may be implemented by using any number of different hardware and software components as is known to one skilled in the art. Memory 130 generally includes volatile memory, such as random access memory (RAM), and a computer readable medium.

Computing devices or processors may employ any of a number of computer operating systems, including, but not limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system.

Computing devices and processors generally each include instructions executable by one or more devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, an assembly language, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable media includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, an EEPROM, a Flash memory device, any other memory chip or cartridge, a carrier wave as described hereinafter, or any other medium from which a computer can read.

Wireless communication system 132 enables alarm monitoring device 120 to wirelessly communicate with remote devices, generally using known communication protocols. Wireless communication system 132 is generally secured within enclosure 124, and in electrical communication with processor 128 to wirelessly communicate with remote devices. Wireless communication system 132 includes an antenna 132*a*, and may include both a short-range and a long-range communication device. For example, wireless communication system 132 may include a low power radio, a Wi-Fi device, a Bluetooth device, or other such short-range wireless communication device. Furthermore, wireless communication system 132 may also include a cellular modem for longer-range communications with various cellular networks using known communication protocols. In one embodiment, the alarm monitoring device 120 may be configured to communicate directly with the central monitoring station 114. In other words, instead of constantly monitoring the alarm base station 122, the central monitoring station 114 may alternatively constantly monitor the alarm monitoring device 120. In this embodiment, the central monitoring station 114 receives periodic updates from the alarm monitoring device 120, and in the event that such updates cease, central monitoring station 114 may provide various services, such as calling customer premises 102 or dispatching the police to customer premises 102. Alternatively, alarm monitoring device 120 may be configured to determine if it is out of range of base station 122, and respond by, for example, enabling a position tracker. In this exemplary approach, base station 122 or central monitoring station 114 may still provide the various services previously described, or alternatively, the alarm monitoring device 120 may communicate directly with the communication network 108 to request and/or provide the various services. Accordingly, wireless communication system 132 can communicate with devices located within customer premise 102, and with remote devices through a cellular network and/or through the Internet.

Control panel 134 provides a user interface that may include various switches, indicators, and controls. For example, control panel 134 may include a user interface control panel secured within enclosure 124 and accessible to a user of the alarm device. Control panel 134 may include a power switch, a loop on/off indicator, a motion detector on/off indicator, various indicator lights, a sensor selection switch, a numeric or alphanumeric keypad, and a display device such as a liquid crystal display (LCD). A user can use one or more controls to activate/deactivate alarm monitoring device 120, thereby arming and disarming the device. Furthermore, a user can interact with various computer programs through control panel 134 and manipulate various configuration options, sensors, etc. Alternatively, alarm monitoring device 120 may not include control panel 134, but may be controlled remotely by or through another device, such as a remote control or through a computer. For example, processor

128 and memory 130 may provide an internal web server as a user interface for a user to configure and control alarm monitoring device 120 remotely.

A tracking device or service, such as a global positioning system (GPS) receiver 140, provides location information for alarm monitoring device 120. It is appreciated that other tracking devices or services, besides GPS, may be used. In one exemplary approach, the GPS receiver 140 may use a GPS broadcast signal received from one or more GPS satellite broadcast systems. Generally, the GPS receiver 140 monitors a location of the alarm monitoring device 120 to provide location information to a remote device in response to a security event. For example, the processor 130 may periodically receive location information from the GPS receiver 140 in the form of longitude and latitude coordinates. The processor 130 may be configured to initiate an alert in response to a change in the received location information that indicates an unanticipated movement of the alarm monitoring device 120. Furthermore, the processor 130 may be configured to relay location information from the GPS receiver 140 to a remote device through the wireless communication system 132. If the secured property is stolen, such location updates may aid police in locating and recovering the stolen property. Although shown as part of the alarm monitoring device 120, the GPS receiver 140 may alternatively be disposed in the base station 122.

Constantly receiving the location of the alarm monitoring device 120 from the GPS receiver 140 may quickly deplete the power source 126. Therefore, the system 100 may be configured so that the GPS receiver 140 is selectively enabled to conserve the power source 126. In one exemplary approach, the alarm monitoring device 120 may be configured to detect a movement relative to the base station 122. Specifically, the alarm monitoring device 120 may receive signals transmitted by the base station 122, and determine the distance based on the strength of the signal. Once movement is detected, the alarm monitoring device 120 may enable the GPS receiver 140 in response to the movement. Moreover, the base station 122 may communicate with other devices to determine whether a perimeter has been breached, and if so, wake up the GPS receiver 140 in response. In this and the other embodiments discussed, the central monitoring station 114 may alternatively wake up the GPS receiver 140 instead of the base station 122. The alarm monitoring device 120, base station 122, or central monitoring station 114 may be configured to enable the GPS receiver 140 in response to other situations. In these exemplary approaches, the alarm monitoring device 120 may be configured to only enable the GPS receiver 140 if the power source 126 is at an adequate level to prevent further strain on the power source 126. This way, the GPS receiver 140 functions like an on-demand GPS system so that it's not constantly draining the power source 126. However, it is appreciated that the GPS receiver 140 may be enabled and/or woken up through other methods than described. In addition, GPS servicing or monitoring fees would also be reduced if the GPS function was only enabled according to a selective, on-demand basis. In other words, in this embodiment, a consumer would not be charged for GPS unless it was utilized.

It is appreciated that some movement of the alarm monitoring device 120 may be authorized. Accordingly, in one exemplary approach, instead of enabling the GPS receiver 140 in response to movement of the alarm monitoring device 120, the GPS receiver 140 may be enabled only if the movement of the alarm monitoring device 120 is not authorized. In other words, the GPS receiver 140 may be enabled if the security event occurs while the system 100 is armed. If the system 100 includes multiple alarm monitoring devices 120, the GPS receivers 140 of one or more of the alarm monitoring devices 120 may be selectively enabled based on whether movement of the alarm monitoring device 120 indicates a security event. Therefore, movement of some of the alarm monitoring devices 120 may indicate the security event (i.e., the movement is unauthorized), while movement of other of the alarm monitoring devices 120 may not indicate the security event (i.e., the movement is authorized). In one exemplary approach, the base station 122 may periodically transmit signals that inform the alarm monitoring device 120 of whether the system 100 is armed or disarmed. Based on this information, the alarm monitoring device 120 is able to autonomously determine whether to initiate a tracking session. Once the alarm monitoring device 120 begins tracking, a message may be transmitted from the alarm monitoring device 120 to the base station 122 so that a local alarm will sound, and in one exemplary approach, an additional alarm message may be transmitted to the central monitoring system 114 via, for example, the communication network 108. The alarm monitoring device 120 may then establish a connection to the communication network 108, such as through cellular base station 106, and begin to send location information to the central monitoring system 114 and/or web server 112. The web server 112 may then be accessed by an authorized user and/or authorities to determine the last known location of the alarm monitoring device 120.

In addition, the alarm monitoring device 120 may initiate the GPS receiver 140 or other tracking device when the periodic communication with the base station 122 ceases for a predetermined amount of time and/or a security event or movement of the alarm monitoring device 120 occurs. This way, if the alarm monitoring device 120 was prevented from receiving signals from the base station 122, the GPS receiver 140 may still be enabled to track movement of the alarm monitoring device 120. Furthermore, it would prevent the alarm monitoring device 120 from being moved too far from the base station 122 without being tracked.

It is appreciated that periodic communication between the alarm monitoring device 120, the base station 122, and/or the central monitoring station 114 may be through any protocol, such as a radio link broadcasting at a specific frequency, a Zigbee stack, WiFi, or any other known or proprietary communication protocol. Moreover, that frequency or a different frequency may be used to communicate security events and/or trigger alarms or tamper messages between the alarm monitoring device 120 and the base station 122. For example, the periodic communication, the security event, and/or the tamper messages may be transmitted at a frequency of around 900 MHz or a frequency around 2.4 GHz. However, both of these frequencies are merely exemplary and other frequencies may be used. Furthermore, redundant communication may be used. In one exemplary approach, if the periodic communication using one protocol ceases, the alarm monitoring device 120, the base station 122, and/or the central monitoring station 114 may begin to communicate through another protocol that has a different range, for example, as a backup.

The GPS receiver 140 may be used with other communication devices for tracking purposes, especially if alarm monitoring device 120 is not in an open area and able to communicate with a satellite. If the GPS receiver 140 is unable to communicate with the satellite, the alarm monitoring device 120 may be configured to communicate with one or more other tracking devices, such as triangulated cellular base stations 106. Specifically, multiple cellular base stations 106 may be used to determine the location of the alarm monitoring device 120 when the GPS receiver 140 is either providing inaccurate or incomplete location information. It is appreciated that other tracking devices may be used besides the GPS receiver 140 or cellular base station 106. Any tracking device that provides triangulation of the alarm monitoring device 120 may be used to provide location information. Moreover, the location information may be provided by any protocol, including public or private radio networks, such as cellular towers, WiFi, or WiMax, among others.

Sensors 136 may include one or more devices for detecting different types of security events such a motion detector (shown in FIG. 3) to detect potential intruders near monitoring device 120. Generally, a motion detector is adapted to monitor a zone outside of the enclosure 124. A motion detector sensor may use any number of different technologies including passive infrared (PIR), ultrasonic, and microwave. Sensors 136 may detect movement of alarm monitoring device 120 through the use of one or more of the following devices: a tilt sensor, a vibration sensor, or an accelerometer. Sensors 136 may also monitor environmental conditions through a heat sensor, smoke detector, a digital thermometer, a rain gauge, a glass breaking sensor, etc. Sensors 136 may also provide audio and visual feedback from the area around alarm monitoring device 120 through the use of a microphone and/or video camera or webcam. Furthermore, sensors 136 may include an external sensor that wirelessly communicates with alarm monitoring device 120 through wireless communication system 132. In response to sensors 136 triggering a security event, siren 138 creates an audible alert in alarm monitoring device 120. In one embodiment, siren 138 is a piezo siren, but may also be any other type of audible alert system. Moreover, the sensor 136 may, directly or indirectly, enable GPS receiver 140 in response to the security event, and/or transmit messages to the base station 122, central monitoring station 114, or any other device. For example, triggering the security event includes the alarm monitoring device 120, the base station 122, or the central monitoring station 114 transmitting SMS, MMS, or another types of text message to a cell phone, and/or transmitting an email to the personal computer 110.

In one exemplary implementation, if the alarm monitoring device 120 is placed within a vehicle 118 as illustrated in FIG. 1, movement of the vehicle 118 may cause the sensor 136 to trigger a security event. Specifically, the sensor 136 may include the accelerometer, a tilt sensor, and/or a vibration sensor that detects movement of the alarm monitoring device 120, and thus, movement of the vehicle 118. Alternatively, or as a redundant way to detect movement, the alarm monitoring device 120 may be engaged in two-way communication with the base station 122 via any communication protocol that allows for regular communication between the base station 122 and the alarm monitoring device 120 at predetermined intervals. Moving the alarm monitoring device 120 out of the range of the base station 122 disrupts the communication and indicates movement of the alarm monitoring device 120. Based on this movement, the alarm monitoring device 120 or the base station 122 may trigger the security event, including sounding the siren 138 and/or enable the GPS receiver 140.

Alarm monitoring device 120 may also include a security loop 142 for securing alarm monitoring device 120 to an article of property. In one embodiment, security loop 142 is a retractable cable assembly that can be reversibly drawn from enclosure 124, looped around an article of property, and then attached to enclosure 124. In one embodiment, security loop 142 is a flexible cable stored inside enclosure 124 and accessible through cable access 144. A user can pull security loop 142 from cable access 144, loop or wrap the cable around an article of property, and then secure the cable to an attachment point 146. Security loop 142 may create a closed electrical connection when secured to attachment point 146. In such an embodiment, a security event occurs if the electrical connection is unexpectedly interrupted, such as by cutting loop 142 or pulling loop 142 from attachment point 146. Moreover, the security event caused by interrupting the security loop 142 may, directly or indirectly, enable GPS receiver 140.

Figure 3A:
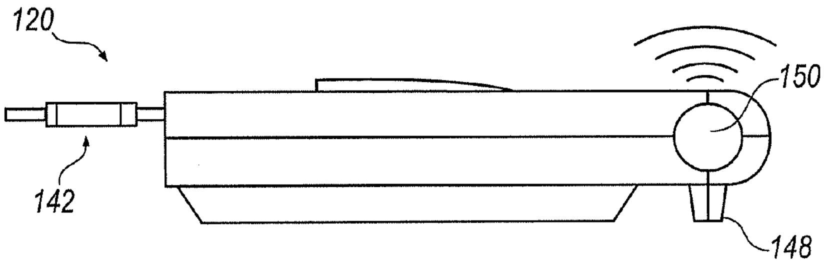

Enclosure 124 is a lightweight housing made from plastic, and sized to be easily portable. For example, in one embodiment, as shown in FIGS. 3A, B and C, alarm monitoring device 120 may be approximately 3.5 inches long by 3.5 inches wide. Enclosure 124 may also include various protective features, including shock absorbers and waterproofing. For example, enclosure 124 may include internal and external padding or rubber coatings to protect the unit and internal components from the impact or shock of a fall, such as when a person drops the unit onto a hard surface like concrete. Enclosure 124 may be waterproofed to protect internal components from exposure to the elements by including weather stripping in exposed joints, or by encasing enclosure 124 in a sealed waterproof material. Enclosure 124 may also be designed to stand upright or include adjustable legs 148 to direct a sensor in a particular direction. For example, alarm monitoring device 120 may include an external motion detector 150, and enclosure 124 may be designed to ensure that the motion detector 150 can be directed to a pre-determined area. In one exemplary approach, the motion detection 150 may include a camera lens or other device capable of capturing still or moving images (i.e., video) when the motion detector 150 is triggered and/or enabled. Furthermore, enclosure 124 may also include various fasteners, such as clips or magnetic strips to secure alarm monitoring device 120 to a particular article of property. For example, enclosure 142 may include magnetic strips so that alarm monitoring device 120 can be secured to an article of property that includes metal, like a vehicle or piece of construction equipment. As an alternative, enclosure 124 may be mounted to a wall, window or door to monitor movement, and may optionally include a door/window switch to monitor the opening of a door or window.

Figure 3B:
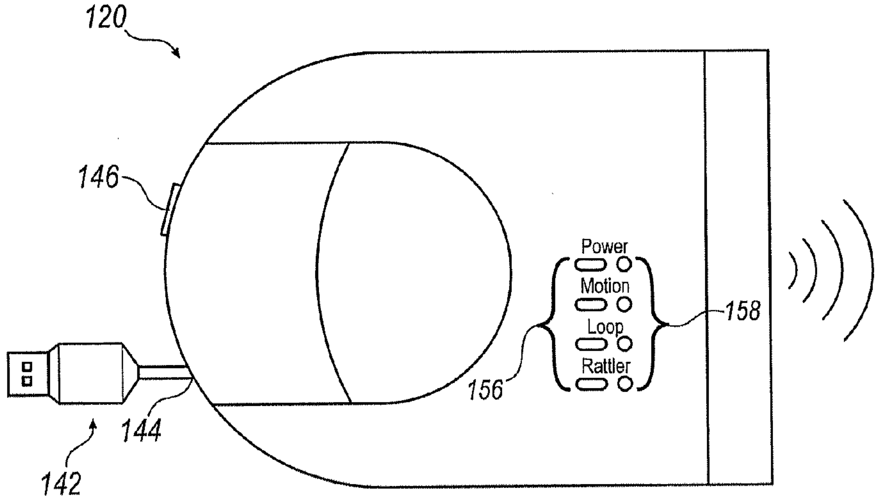
Figure 3C:
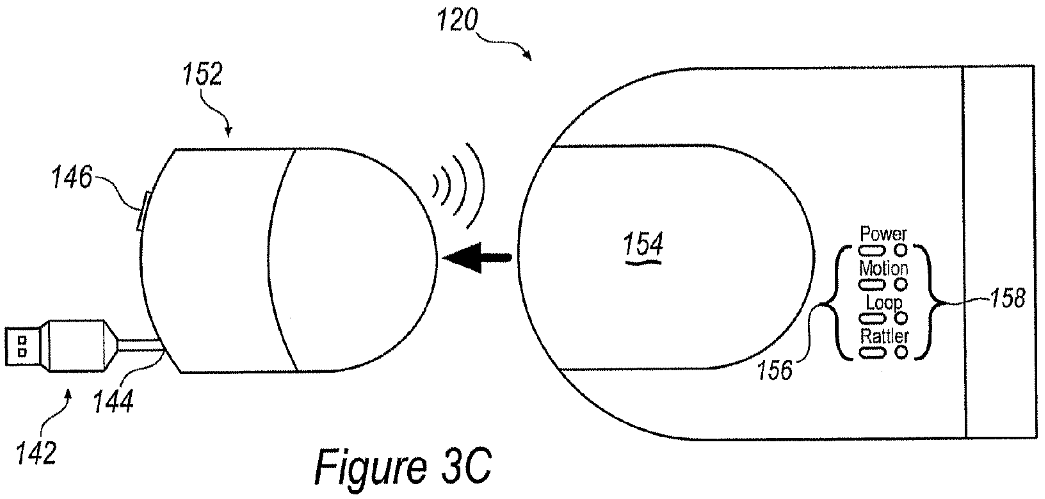

FIGS. 3A, B and C illustrate an exemplary compact alarm monitoring device 120, wherein FIGS. 3A and 3B are side and top elevation views, respectively, and FIG. 3C is a top elevation view showing the alarm monitoring device 120 with a detachable loop mechanism 152. The detachable loop mechanism 152 is a feature that provides an additional optional accessory to the alarm monitoring device 120. As described above, the alarm monitoring device 120 has the capability to operate as a solo alarm device, wherein the alarm monitoring device 120 includes a wireless communication system 132 that provides independent wireless transmission to a central monitoring station 114 using wireless transmitters and receivers. Alarm monitoring device 120 also has the capability to operate as an accessory to an alarm base station 122. Similar to the capability of the alarm monitoring device 120 being configured to operate as an accessory to an alarm base station, the detachable loop mechanism 152 is configured to operate as an accessory to the alarm monitoring device 120. In other words, the detachable loop mechanism 152 is like an accessory within an accessory. For example, the detachable loop mechanism 152 is configured to separate from a base platform 154 of the alarm monitoring device 120 and attach to an article of property. If the connection to the article of property is broken, or if there is an indication that the detachable loop mechanism 152 has gone outside a protected perimeter, a triggering event signal is sent to the base of alarm monitoring device 120 and subsequently communicated to either to a central monitoring station 114 or an alarm base station 122. The face of the alarm monitoring device 120 further includes a variety of push buttons 156 for activating and controlling certain features of alarm monitoring device 120 and indicator lights 158, which provide on/off status information to the user. Furthermore, the detachable loop mechanism 152 may include its own power source that is charged by the base platform 154 while the detachable loop mechanism 152 is mounted on the base platform 154.

The detachable loop mechanism 152 may also be equipped with a GPS capability, including its own GPS receiver 140 so that the detachable loop mechanism 152 can be tracked in the event that a perimeter break has occurred, if the periodic communication between the alarm monitoring device 120 and the base station 122 is broken, if movement of the alarm monitoring device 120, and specifically, the detachable loop mechanism 152, is unauthorized, if the loop 142 is cut or detached from the attachment point 146, and/or in response to any other security event. Moreover, the detachable loop mechanism 152 may be configured to periodically communicate directly with the alarm monitoring device 120 and/or the base station 122, and become aimed once the periodic communication ceases and enable the GPS receiver 140 or other tracking device. The detachable loop mechanism 152 may be configured to transmit information back to the alarm monitoring device 120, the base station 122, and/or the central monitoring system 114 using any communication protocol or frequency, such as 900 MHz or 2.4 GHz, for example. It is appreciated that changing the communication frequency allows for the detachable loop mechanism 152 to be at varying distances from the rest of the alarm monitoring device 120, base station 122, and/or central monitoring system 114. For example, using a cellular communication protocol would allow the detachable loop mechanism 152 to be considerably further from the alarm monitoring device 120, base station 122, or central monitoring station 114. Moreover, the detachable loop mechanism 152 may be automatically armed whenever it is detached from the base platform 154 of the alarm monitoring device 120 and begin tracking and/or detecting security events immediately.

In operation, the detachable loop mechanism 152 has many possible uses. For example, the detachable loop mechanism 152 may be used to secure property at a large hotel or resort environment. The user could attach the detachable loop mechanism 152 to a boat, motorcycle, RV, ATV, bicycle, or other personal property. The base station 120 or alarm monitoring device 120 may be located remotely, such as in the hotel room. If the hotel room is out of the range of 900 MHz or 2.4 GHz communication, the detachable loop mechanism 152 may use cellular communication to communicate with the base station 122, or alarm monitoring device 120. It is appreciated that the detachable loop mechanism 152 may alternatively communicate with the central monitoring station 114. If a security event occurs, a message indicating the security event may be transmitted to the user's cellular phone via a text message, which may include a link for an internet website so that the viewer can immediately access the latest location information from the detachable loop mechanism 152 via the GPS receiver 140.

Either the detachable loop mechanism 152 and/or the alarm monitoring device 120 may be configured to communicate with various types of sensors. Specifically, the detachable loop mechanism 152 and/or the alai iii monitoring device 120 may include contacts or hardwired inputs that can connect to other sensors, such as a water detection system and/or a fire detection system. However, it is appreciated that the water detection system and fire detection system are merely exemplary and the detachable loop mechanism 152 and/or the alarm monitoring device 120 may be hardwired to communicate with any other type of sensor. Furthermore, it is appreciated that any number of detachable loop mechanisms 152 may be disposed on a single base platform 154 and communicate with the alarm monitoring device 120, the base station 122, and/or the central monitoring station 114. Moreover, each detachable loop mechanism 152 may include its own tracking device, such as GPS receiver 140.

In one embodiment, the alarm monitoring device 120 may be controlled by an electronic key fob 160 (shown in FIG. 1), which is generally a small electronic device capable of receiving signals from alarm monitoring device 120. A person may keep electronic key fob 160 on their person or nearby so as to be alerted when portable alarm device detects a security event via any communication protocol, such as a cellular communication protocol. Furthermore, electronic key fob 160 may include a control panel so a user can remotely arm, disarm, or otherwise configure alarm monitoring device 120. Electronic key fob 180 is generally a small, portable electronic device capable of wireless communicating with alarm base station 122 within customer premises 102, generally within a range of no less than 1000 feet, and much further if the cellular communication protocol is used. Of course, electronic key fob 160 may also wirelessly communicate with alarm base station 122, and use alarm base station 122 to relay electronic messages to and from alarm monitoring device 120.

Figure 4:
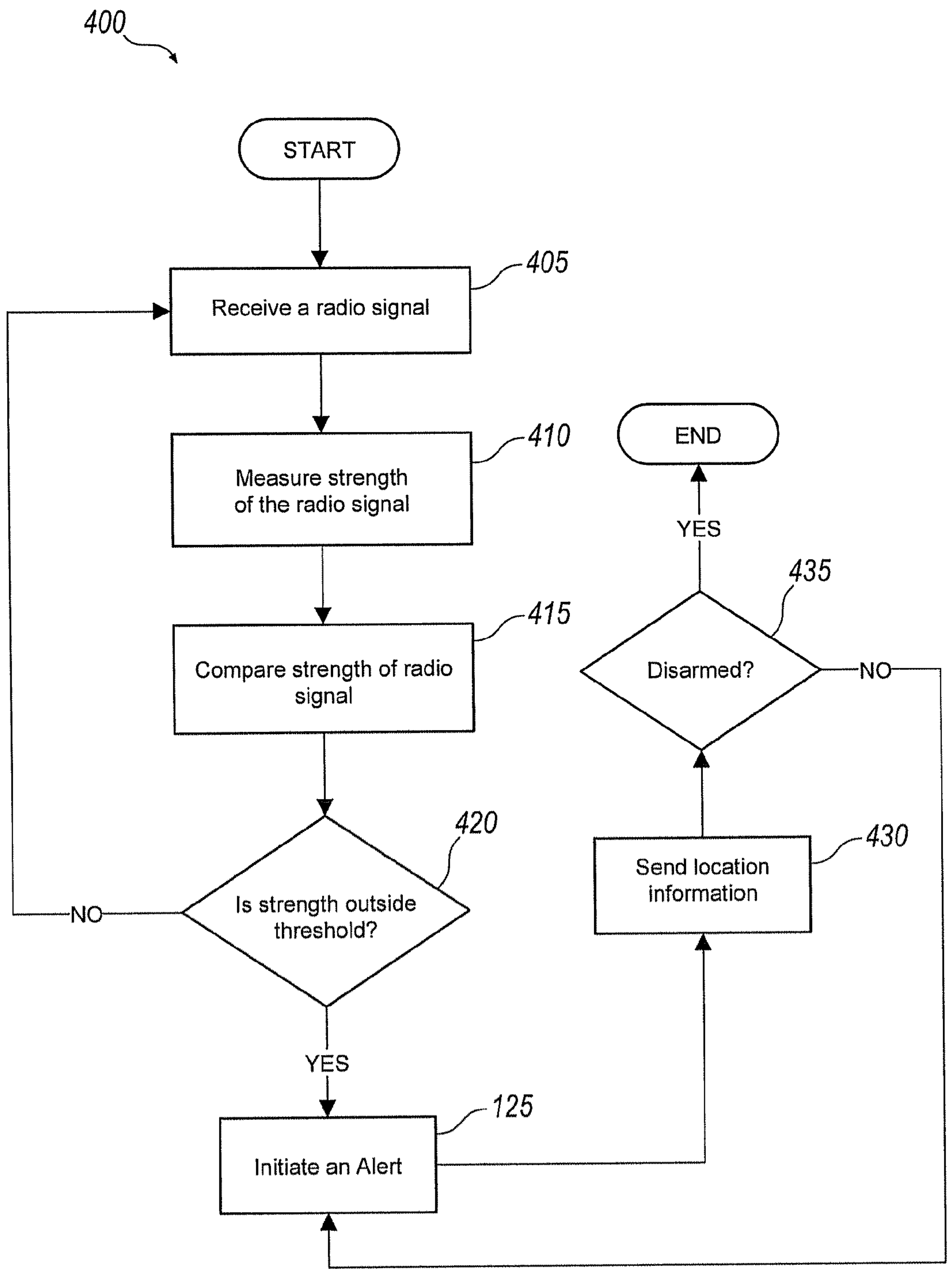

As described above alarm monitoring device 120 may use various sensors 136 to detect a security event. FIG. 4 illustrates an exemplary process 400 of a security program for alarm monitoring device 120 for detecting a security event without using sensors 136. Alarm monitoring device 120 uses processor 128 and wireless communication system 132 to monitor the distance between monitoring device 120 and alarm base station 122, according to process 400. A change in distance may be viewed as a security event, causing alarm monitoring device 120 to initiate an alert.

Process 400 begins at step 405 when alarm monitoring device 120 receives a radio signal from alarm base station 122, which may periodically send a signal to alarm monitoring device 120, or the received radio signal may be sent in response to a signal sent by alarm monitoring device 120, such as in a request and acknowledgement system. Next in step 410, alarm monitoring device 120 measures the strength of the received radio signal. Wireless communication system 132 and process 128 analyze the received signal to determine a signal strength value.

Next in step 415, the signal strength value from step 410 is compared to a pre-determined or calculated value. For example, alarm monitoring device 120 may measure and store the signal strength value from the first received radio signal. Subsequently received radio signals are then compared to that initially received radio signal strength. In another embodiment, alarm monitoring device 120 may compare the strength of the received radio signal to the previously received signal. In another embodiment, alarm monitoring device 120 uses numerous received radio signals to calculate a signal strength tolerance. The strength of subsequently received radio signals are then compared using this tolerance. In each embodiment, alarm monitoring device 120 creates a threshold signal strength value or tolerance. That signal strength value or tolerance may be zero, meaning alarm monitoring device 120 has lost communication with alarm base station 122.

Next in step 420, the strength of the received radio signal is checked against the threshold value to determine if a security event has occurred. In this case, a security event is an unanticipated change in distance between alarm monitoring device 120 and alarm base station 122. The change in distance is calculated by the change in signal strength from received radio signals. If the signal strength of the received radio signal is within tolerance or within the threshold values, then alarm monitoring device 120 returns to step 405. If the signal strength is outside the tolerance by either being too strong or too weak, then alarm monitoring device 120 moves to step 425.

In step 425, alarm monitoring device 120 initiates an alert. In one embodiment, alarm monitoring device 120 uses wireless communication system 132 to send an alert to alarm base station 122, central monitoring device 114, or both. Of course, alarm monitoring device 120 could send an alert to other remote devices, such as by alerting electronic key fob 160, alerting PC 110, web server 112, or sending an email, text message, etc. Next in step 430, alarm monitoring device 120 may enable and send location information from GPS receiver 140 to a remote device, such as alarm base station 122 or central monitoring station 114. In another exemplary approach, alarm monitoring device 120 may enable GPS receiver 140 if the signal between alarm monitoring device 120 and base station 122 is lost, or if alarm monitoring device 120 is moved outside of a predetermined perimeter.

Next in step 435, alarm monitoring device 120 checks to see if it has received a disarm command. Alarm monitoring device 120 may be disarmed through control panel 134 or from a remote device, such as alarm base station 122, electronic key fob 160, PC 110, web server 112, or central monitoring station 114. If alarm monitoring device 120 has not been disarmed, then alarm monitoring device 120 returns to step 425. If alarm monitoring device 120 has been disarmed, then process 400 ends.

Of course, process 400 is simply one example of a program to detect a security event. Alarm monitoring device 120 may utilize other programs and sources of location information to monitor the position of alarm monitoring device 120. For example, alarm monitoring device 120 may monitor data received from GPS receiver 140 to detect a security event—namely, the unanticipated movement of alarm monitoring device 120. Other such embodiments and variations are recognizable to one skilled in the art, and such embodiments are within the spirit and scope of the present disclosure.

With regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as “a,” “the,” “said,” etc. should be read to recite one or more of the indicated elements unless a claim recites an explicit limitation to the contrary.

I claim:

1. A portable alarm device, comprising:

a portable enclosure;

a wireless communication system disposed in the portable enclosure and configured to receive a signal from a monitoring device;

a processor in communication with the wireless communication system and wherein the processor is configured to initiate an alert when the signal indicates that the portable enclosure is beyond a pre-determined distance from the monitoring device; and a tracking device configured to be selectively enabled in response to movement of said portable enclosure.

2. The device of claim 1, wherein the movement of the portable enclosure is detected by measuring a strength of a radio signal received from a monitoring device.

3. The device of claim 1, wherein the movement of the portable enclosure is detected by monitoring location information received from said tracking device.

4. The device of claim 1, further comprising a vibration sensor configured to detect movement of the portable enclosure, and wherein the processor is configured to initiate an alert in response to a detection of movement.

5. The device of claim 1, further comprising a tilt sensor configured to detect movement of the portable enclosure, and wherein the processor is configured to initiate an alert in response to a detection of movement.

6. The device of claim 1, further comprising a motion detector configured to detect movement within a pre-determined range from the portable enclosure, and wherein the processor is configured to initiate an alert in response to a detection of movement.

7. The device of claim 1, further comprising a siren.

8. The device of claim 1, further comprising a security loop that can be secured to an article of property.

9. The device of claim 1, further comprising a retractable cable contained within the enclosure and adapted to be drawn from and locked onto the enclosure, thereby creating a closed security loop.

10. The device of claim 9, wherein the processor initiates an alert in response to a disconnect in the security loop.

11. The device of claim 1, wherein the alert is sent to the monitoring device via the wireless communication system.

12. The device of claim 1, wherein the alert is sent to a central monitoring station via the wireless communication system.

13. The device of claim 1, wherein the alert is sent to an electronic key fob via the wireless communication system.

14. The device of claim 1, wherein the wireless communication system includes a cellular modem.

15. The device of claim 1, wherein the processor, after initiating an alert, is further configured to provide location information from a tracking device.

16. The device of claim 1, further comprising a power source.

17. The device of claim 16, wherein the power source is a non-rechargeable battery, a rechargeable battery, a solar cell, a connection to an AC power outlet, or a connection to a DC power outlet.

18. The device of claim 1, further comprising a control panel.

19. The device of claim 1, further comprising a magnetic material fixedly attached to the portable enclosure to permit the portable enclosure to be releasably secured to a metallic surface of an article of property.

20. A method of securing an article of property, comprising:

receiving a signal from a monitoring device;

measuring a strength of the signal;

using the strength of the signal to detect unanticipated movement of an article of property; and sending a signal to wake up a tracking device in said monitoring device in response to the detected unanticipated movement.

21. The method of claim 20, further comprising periodically sending location information from said tracking device after sending the alert.

22. A security system, comprising:

a monitoring device; and a base station configured to communicate with the monitoring device and a central monitoring station, wherein the base station is configured to send a signal to wake up a tracking device in said monitoring device in response to a detected security event.

23. The system of claim 21, wherein the security event is unanticipated movement of the base station.

24. The system of claim 21, further comprising an electronic key fob configured to receive an alert from the portable alarm system.

25. The system of claim 21, further comprising an electronic key fob that allows a user to remotely arm and disarm the base station.

26. The system of claim 21, further comprising a web server configured to communicate with the base station.

27. The system of claim 21, wherein the base station is configured to send location information from a tracking device to the central monitoring station.

28. The system of claim 21, wherein the base station is further configured to send an alert to a cellular phone via a text message.

29. A portable alarm monitoring device, comprising:

a base platform having a wireless transceiver;

a detachable loop mechanism having one or more cables configured to selectively form a closed loop, said loop mechanism having a wireless transmitter configured to communicate wireless signals to said wireless transceiver of said base platform and further configured to be selectively physically coupled and decoupled from said base platform.

30. The portable alarm device of claim 29, wherein said loop mechanism includes a loop having a retractable cable assembly configured to be reversibly drawn from said loop mechanism.

31. The portable alarm device of claim 30, wherein said loop mechanism defines an attachment point such that said loop is configured to mate with said attachment point and wherein disconnecting said loop from said attachment point indicates a security event.

32. The portable alarm device of claim 30, wherein cutting said loop indicates a security event.

33. The portable alarm device of claim 29, wherein said loop mechanism includes a tracking device configured to provide location information to at least one of said station and said monitoring device.

34. The portable alarm device of claim 33, wherein said loop mechanism is configured to enable said tracking device based on a security event.

35. The portable alarm device of claim 33, wherein said loop mechanism is configured to enable said tracking device based on a proximity of said loop mechanism to said base platform.

36. The portable alarm device of claim 33, wherein said loop mechanism is configured to enable said tracking device based on a proximity of said monitoring device to said base station.

37. The portable alarm device of claim 33, wherein said loop mechanism is configured to enable said tracking device based on movement of said loop mechanism.

* * * * *